US007180551B2

(12) United States Patent
Katayama et al.

(10) Patent No.: US 7,180,551 B2

(45) Date of Patent: Feb. 20, 2007

(54) METHOD, APPARATUS, AND PROGRAM FOR IMAGE SELECTION

(75) Inventors: Takeshi Katayama, Kaisei-machi (JP); Masamitsu Hashimoto, Miyagi-ken (JP); Hiroyuki Niwano, Miyagi-ken (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 567 days.

(21) Appl. No.: 10/648,353

(22) Filed: Aug. 27, 2003

(65) Prior Publication Data

US 2004/0042762 A1 Mar. 4, 2004

(30) Foreign Application Priority Data

Aug. 27, 2002 (JP) ............................ 2002-246989

(51) Int. Cl.

*H04N 5/14* (2006.01)
*H04N 5/44* (2006.01)
*H04N 5/50* (2006.01)
*H04N 5/445* (2006.01)
*H04N 9/64* (2006.01)
*H04N 9/79* (2006.01)

(52) U.S. Cl. ...................... 348/553; 348/563; 348/569; 348/575; 348/734; 386/35

(58) Field of Classification Search ................ 348/553, 348/563, 569, 575, 734; 386/35

See application file for complete search history.

(56) References Cited

U.S. PATENT DOCUMENTS

| | | | | |
|---|---|---|---|---|
| 5,963,704 | A * | 10/1999 | Mimura et al. | 386/95 |
| 6,208,341 | B1 * | 3/2001 | van Ee et al. | 715/716 |
| 6,246,401 | B1 * | 6/2001 | Setogawa et al. | 715/723 |
| 6,246,402 | B1 * | 6/2001 | Setogawa et al. | 715/723 |
| 6,353,461 | B1 * | 3/2002 | Shore et al. | 348/722 |
| 6,795,011 | B1 * | 9/2004 | Berthoud et al. | 341/173 |
| 2003/0038895 | A1 * | 2/2003 | Yang et al. | 348/569 |
| 2005/0220366 | A1 * | 10/2005 | Watanabe et al. | 382/305 |

* cited by examiner

*Primary Examiner*—Brian P. Yenke

(74) *Attorney, Agent, or Firm*—Birch, Stewart, Kolasch & Birch, LLP

(57) ABSTRACT

An operation for selecting a desired one of images can be simplified. Still image data sets are sequentially read from a recording medium according to order of file names and displayed on a TV. Upon display, the still image data sets are in a non-selection state. If an instruction is not input from a remote controller within a predetermined time since the display of one of the still image data sets, the still image data set being displayed is set to a selection state and the following still image data set having the file name that comes next is displayed. If an instruction is input from the remote controller for display of the following still image data set within the predetermined time, the still image data set being displayed is left in the non-selection state, and the following still image data set is displayed.

18 Claims, 7 Drawing Sheets

METHOD, APPARATUS, AND PROGRAM FOR IMAGE SELECTION

This nonprovisional application claims priority under 35 U.S.C. § 119(a) on Patent Application No(s). 2002-246989 filed in JAPAN on Aug. 27, 2002, which is(are) herein incorporated by reference.

BACKGROUND OF THE INVENTION

1. Field of the Invention

The present invention relates to an image selection method and an image selection apparatus for carrying out selection from images displayed on a monitor such as a TV set. The present invention also relates to a program for causing a computer to execute the image selection method.

2. Description of the Related Art

With use of a DVD player, a movie recorded in a DVD can be reproduced on a household TV set, and music recorded in a CD can be reproduced. By using a DVD player, displaying still image data representing still images recorded in a recording medium such as a DVD or a CD is also becoming a reality. Therefore, if image data obtained by a digital camera or by reading a photographic film are recorded in a recording medium, a user can appreciate images he/she photographed with his/her friends and family by displaying the images on a household TV set.

A DVD player having a function of a Web browser used for connection to the Internet has also been provided. In the case where a DVD player has the function of a Web browser, a user can surf the Internet by using a TV set. Furthermore, the user can access a Web site of a DPE store that provides a printing service using image data, and can receive a network printing service such as printing, album generation, and storage regarding still image data he/she obtained.

Meanwhile, since a recording medium can record a plurality of still image data sets, a user needs to select a portion of the still image data sets to be reproduced or used for a service in the case where the user wishes to request the service such as printing. Therefore, thumbnail images represented by the still image data sets are generated and displayed as a catalog on a TV set, and the user selects and determines the images by using Left, Right, Up, and Down keys of a remote control of a DVD player.

However, image display using a DVD player is often carried out in a comparatively relaxed state, unlike the case of using a personal computer. Therefore, image selection by repetitively pressing small keys on a remote control is troublesome.

SUMMARY OF THE INVENTION

The present invention has been conceived based on consideration of the above circumstances. An object of the present invention is therefore to enable easy image selection.

A first image selection method of the present invention is a method of instructing selection or non-selection regarding a plurality of images, and the first image selection method comprises the steps of:

displaying selection status information representing a selection or non-selection state of each of the images being attached thereto when the images are sequentially displayed in predetermined order;

displaying one of the images without changing the selection status information of an immediately preceding one of the images in the case where a display instruction thereof has been input within a predetermined time after display of the immediately preceding image, and displaying the image while changing the selection status information of the immediately preceding image in the case where the display instruction has not been input within the predetermined time.

A second image selection method of the present invention is a method of instructing selection or non-selection regarding a plurality of images, and the second image selection method comprises the steps of:

displaying selection status information representing selection or non-selection of each of the images being attached thereto when the images are sequentially displayed in predetermined order;

displaying one of the images while changing the selection status information of an immediately preceding one of the images in the case where a display instruction thereof has been input within a predetermined time after display of the immediately preceding image, and displaying the image without changing the selection status information of the immediately preceding image in the case where the display instruction thereof has not been input within the predetermined time.

The predetermined order refers to ascending or descending order of file names, or ascending or descending order of photography date, for example.

The selection status information refers to information indicating whether or not an image has been selected. In the first and second image selection methods, the selection status information is attached to the images at the time of display thereof. For example, an icon comprising a circle or an X is attached to the image and displayed together, for respectively indicating that the image has been selected or has not been selected. It is preferable for the selection status information to be described in tag information of image data corresponding to the image.

Changing the selection status information refers to changing the selection status information that represent non-selection to represent selection, and to changing the selection status information that represent selection to represent non-selection.

In the first and second image selection methods of the present invention, how the selection status information is displayed may be changed before the selection status information is actually changed.

Changing how the selection status information is displayed refers to a change for causing a user who carries out image selection instruction to understand the fact that the selection status information is going to be changed. For example, the selection status information may blink or a color thereof may be changed.

In the first and second image selection methods of the present invention, a sound may be output for notifying the user of the fact that the selection status information has been changed.

A third image selection method of the present invention is a method of instructing selection or non-selection regarding a plurality of images, and the third image selection method comprises the steps of:

attaching selection status information to one of the images for representing a selection or non-selection state thereof in the case where an instruction for selecting or not selecting the image is input during display of the image in the course of sequential display of the images in predetermined order, and displaying an immediately following one of the images.

In the third image selection method, a sound corresponding to the selection status information to be attached may be output.

A first image selection apparatus of the present invention is an apparatus for instructing selection or non-selection regarding a plurality of images, and the first image selection apparatus comprises:

an input means for inputting a display instruction regarding an image; and selection means for displaying selection status information representing a selection or non-selection state of each of the images being attached thereto when the images are sequentially displayed in predetermined order, displaying one of the images without changing the selection status information of an immediately preceding one of the images in the case where the display instruction thereof has been input within a predetermined time after display of the immediately preceding image, and displaying the image while changing the selection status information of the immediately preceding image in the case where the display instruction thereof has not been input within the predetermined time.

A second image selection apparatus of the present invention is an apparatus for instructing selection or non-selection regarding a plurality of images, and the second image selection apparatus comprises:

an input means for inputting a display instruction regarding an image; and selection means for displaying selection status information representing a selection or non-selection state of each of the images being attached thereto when the images are sequentially displayed in predetermined order, displaying one of the images while changing the selection status information of an immediately preceding one of the images in the case where the display instruction thereof has been input within a predetermined time after display of the immediately preceding image, and displaying the image without changing the selection status information of the immediately preceding image in the case where the display instruction thereof has not been input within the predetermined time.

In the first image selection apparatus and the and second image selection apparatus of the present invention, the selection means may also be means for changing how the selection status information is displayed before changing the selection status information.

In the first image selection apparatus and the second image selection apparatus of the present invention, the selection means may also be means for outputting a sound notifying the fact that the selection status information has been changed.

A third image selection apparatus of the present invention is an apparatus for instructing selection or non-selection regarding a plurality of images, and the third image selection apparatus comprises:

an input means for inputting an instruction regarding selection of an image; and selection means for attaching selection status information to one of the images for representing a selection or non-selection state thereof in the case where an instruction for selecting or not selecting the image is input during display of the image in the course of sequential display of the images in predetermined order, and for displaying an immediately following one of the images.

In the third image selection apparatus, the selection means may also be means for outputting a sound corresponding to the selection status information to be attached.

The first to third image selection methods of the present invention may be provided as programs for causing a computer to execute the methods.

According to the first image selection method and the first image selection apparatus of the present invention, the images are sequentially displayed in the predetermined order, and the selection status information representing selection or non-selection of the respective images is attached to the corresponding images. In the case where the instruction to display one of the images is input within the predetermined time after the immediately preceding image is displayed, the image is displayed without a change of the selection status information of the immediately preceding image. In the case where the display instruction is not input within the predetermined time, the image is displayed and the selection status information of the immediately preceding image is changed.

According to the second image selection method and the second image selection apparatus of the present invention, the images are sequentially displayed in the predetermined order, and the selection status information representing selection or non-selection of the respective images is attached to the corresponding images. In the case where the instruction to display one of the images is input within the predetermined time after the immediately preceding image is displayed, the image is displayed and the selection status information of the immediately preceding image is changed. In the case where the display instruction is not input within the predetermined time, the image is displayed without a change of the selection status information of the immediately preceding image.

In this manner, the selection status information is changed if a user who carries out image selection inputs the display instruction or waits for the predetermined time. Therefore, the user can instruct selection or non-selection of the images with only a few operations, and the user is less burdened at the time of image selection.

By changing how the selection status information is displayed before changing the selection status information, the user can easily understand that the selection status information is going to be changed regarding the image being displayed.

By outputting the sound at the time of selection status information change, the user can easily understand that the selection status information has been changed regarding the image being displayed.

According to the third image selection method and the third image selection apparatus of the present invention, the images are sequentially displayed in the predetermined order. At the time of display, if the instruction for selecting or not selecting one of the images is input during the display of the image, the selection status information representing selection or non-selection of the image is attached to the image and the immediately following image is displayed.

Therefore, if a user who carries out image selection only instructs selection or non-selection of the image being displayed, the selection status information is attached thereto and the immediately following image is displayed. In this manner, the user can instruct selection or non-selection with only a few operations and the user is less burdened at the time of image selection.

By outputting the sound corresponding to the selection status information, the user can easily understand that the image being displayed has been selected or has not been selected.

DESCRIPTION OF THE PREFERRED EMBODIMENTS

Figure 1:
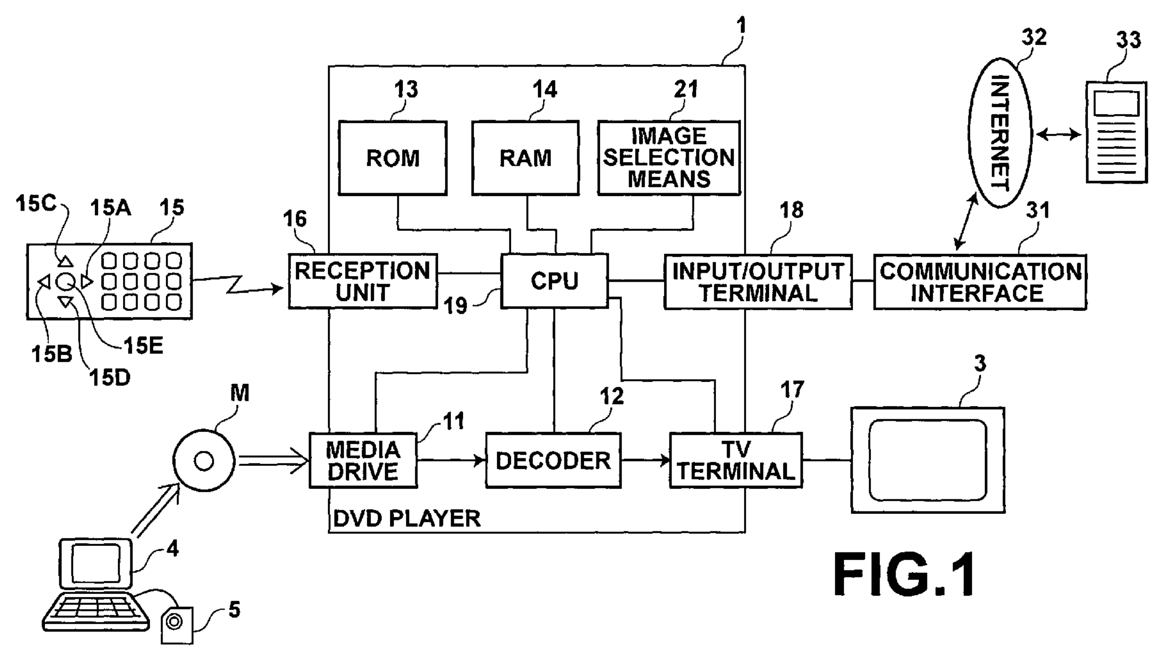
FIG. 1 is a block diagram showing a configuration of a DVD player adopting an image selection apparatus of a first embodiment of the present invention.

Hereinafter, embodiments of the present invention will be explained with reference to the accompanying drawings. FIG. 1 is a block diagram showing a configuration of a DVD player as an image selection apparatus of a first embodiment of the present invention. As shown in FIG. 1, a DVD player 1 in the first embodiment comprises a media drive 11, a decoder 12, a ROM 13, a RAM 14, a reception unit 16, a TV terminal 17, an input/output terminal 18, image selection means 21, and a CPU 19. The media drive 11 receives insertion of a recording medium M, and reads still image data sets, moving image data sets, audio data sets, and the like recorded in the recording medium M. The decoder 12 decodes the still image data sets, the moving image data sets, and the audio data sets. The ROM 13 stores a program and various information for reproducing the still image data sets, the moving image data sets, and the audio data sets. The RAM 14 temporarily stores the data and is used as a work area. The reception unit 16 receives an instruction from a remote control 15. The TV terminal 17 is used for connection to a TV set 3 (hereinafter referred to as the TV 3). The input/output terminal 18 is used for connecting an external apparatus 31 such as a memory card reader, a hard disc, a printer, or a communication interface, and adopts a standard such as USB or IEEE therefor. The image selection means 21 selects still image data sets S0 as will be explained later. The CPU 19 controls the media drive 11, the decoder 12, the ROM 13, the RAM 14, the reception unit 16, the TV terminal 17, the input/output terminal 18, and the image selection means 21.

A personal computer 4 records the still image data sets S0 obtained by a digital camera 5 in the recording medium M.

The still image data sets S0, the moving image data sets, and the audio data sets to be recorded in the recording medium M are compressed according to a format such as JPEG or MPEG. The decoder 12 decompresses the still image data sets S0, the moving image data sets, and the audio data sets recorded in a compressed state in the recording medium M, and inputs the data to the TV terminal 17 for reproduction thereof. The decoder 12 may be installed for each type of the data such as the still image data sets S0, the moving image data sets, and the audio data sets. However, for miniaturization and cost reduction of the apparatus, the decoder 12 is preferably used in common, for the still image data sets S0, the moving image data sets, and the audio data sets. During reproduction of the moving image data sets, images and sounds need to be decoded separately. Therefore, it is preferable for the decoders 12 for the images and the decoder 12 for the sounds to be used separately.

The ROM 13 stores an operation program for the DVD player 1. The operation program causes the CPU 19 to carry out data reproduction, and a user can control the operation of the DVD player by using the remote control 15.

Upon data reproduction instruction, a screen for prompting the user to select the data to be reproduced is displayed on the TV 3, and the media drive 11, the decoder 12, and the CPU 19 are driven by the program so as to reproduce the data selected by the user with use of the remote control 15.

For example, in the case where the user inserts the recording medium M having the moving image data sets in the media drive 11 and instructs reproduction of the moving image data sets, the media drive 11 reads the moving image data sets from the recording medium M, and the decoder 12 decodes the moving image data sets. The decoded moving image data sets are output from the TV terminal 17 to be reproduced on the TV 3.

In the case where the user inserts the recording medium M having the still image data sets S0 in the media drive 11 and instructs reproduction, the media drive 11 reads the still image data sets recorded in the recording medium M, and the decoder 12 decodes the still image data sets S0. The decoded still image data sets S0 are output from the TV terminal 17 and displayed on the TV 3 as still images. In the case where a plurality of the still image data sets are recorded in the recording medium M, thumbnail images of the still image data sets S0 are displayed and the still image data set S0 corresponding to a selected one of the thumbnail image is reproduced.

In the case where the user inserts the recording medium M having the audio data sets in the media drive 11 and instructs reproduction of the audio data sets, the media drive 11 reads the audio data sets recorded in the recording medium M, and the decoder 12 decodes the audio data sets. The decoded audio data sets are output from the TV terminal 17, and a sound is reproduced on the TV 3. The input/output terminal 18 may be connected to a stereo system or a loudspeaker so that the stereo system or the loudspeaker can reproduce the sound.

The ROM 13 stores a Web browser. The user can control the Web browser by an instruction from the remote control 15 so as to connect to the Internet 32 via the communication interface 31 connected to the input/output terminal 18. The user can access a Web site 33 run by a DPE store, and can request a network printing service with the Web site 33 for printing the still image data sets S0, for generating a photograph album using the still image data sets, and for storing the still image data sets.

Instead of the ROM 13, a dedicated IC chip may be used for data reproduction and connection to the Internet 32.

The RAM 14 is used for temporary data storage and as a work area.

The remote control 15 has Up, Down, Left, and Right, keys 15A to 15D and a Determine key 15E. When the user presses any one of the keys, a signal representing an instruction corresponding to the key is sent to the reception unit 16.

The reception unit 16 receives the signal representing the instruction input by the user with use of the remote control 15, and inputs to the CPU 19 the instruction for driving the DVD player 1 according to the instruction. The remote control 15 enables all operations of the DVD player 1, such as reproduction of the still image data sets S0, the moving image data sets, and the audio data sets, and image selection as well as various settings, as will be explained later.

Figure 2:
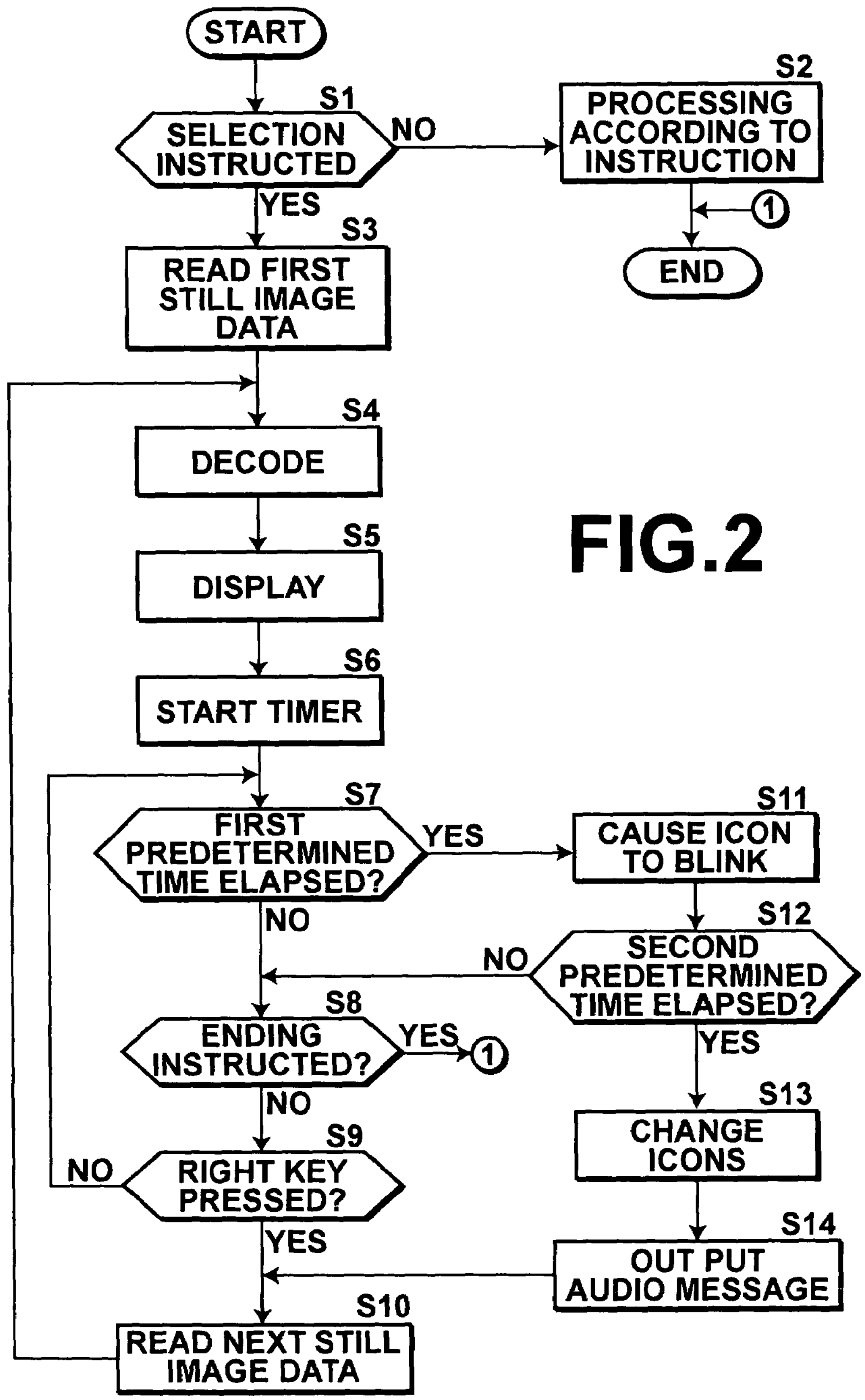
FIG. 2 is a flow chart showing procedures carried out at the time of still image data selection in the first embodiment.

The image selection means 21 selects a desired portion of the still image data sets S0 recorded in the recording medium M. Hereinafter, procedures carried out at the time of selection from the still image data sets S0 will be explained. FIG. 2 is a flow chart showing the procedures carried out by the first embodiment at the time of selection from the still image data sets S0. The recording medium M having the still image data sets S0 is inserted in the media drive 11, and a screen for instructing selection and reproduction of the still image data sets S0 is being displayed on the TV 3.

In the instruction screen, whether or not a still image data selection instruction has been input is judged first (Step S1). If a result at Step S1 is negative, processing corresponding to an instruction selected in the selection screen is carried out (Step S2) to end the procedures. If the result at Step S1 is affirmative, the still image data set S0 having the file name that comes first in the recording medium M is read from the recording medium M (Step S3), and decoded by the decoder 12 (Step S4) to be output from the TV terminal 17 for display on the TV 3 (Step S5).

Figure 3:
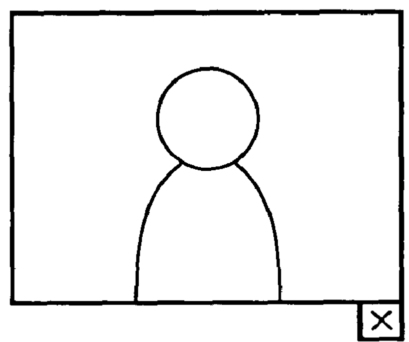
FIG. 3 shows still image data displayed on a TV set (part 1)

FIG. 3 shows how the still image data set S0 is displayed on the TV 3. As shown in FIG. 3, an icon 7A including an X (X) is displayed on the TV 3 in the lower right corner of the still image represented by the still image data set S0. The icon 7A represents the fact that the still image data set S0 being displayed is in a non-selected state.

When the still image is displayed on the TV 3, a timer is started (Step S6) to judge whether or not a first predetermined time (such as 2.5 seconds) has elapsed since display of the still image data set S0 (Step S7).

If a result at Step S7 is negative, whether or not an instruction for ending the operation has been input is then judged (Step S8). If a result at Step S8 is affirmative, the procedures end. If the result at Step S8 is negative, whether or not the Right key 15D has been pressed is judged (Step S9) for display of an immediately following one of the images. If a result at Step S9 is negative, the process returns to Step S7. If the result at Step S9 is affirmative, the still image data set S0 having the file name that comes immediately after the still image data set S0 being displayed is read from the recording medium M (Step S10). The process then returns to Step S4 and the procedures from Step S4 are carried out to display the following still image data set S0 on the TV 3. In the case where the still image data set S0 whose file name comes last is being displayed, the following image data set S0 refers to the still image data set S0 having the file name that comes first.

Figure 4:
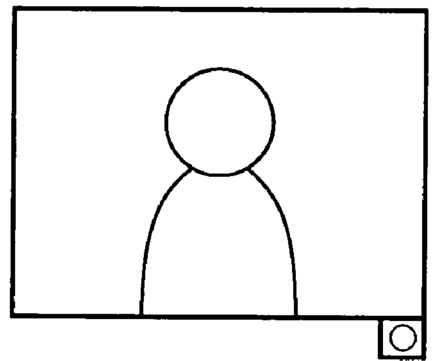
FIG. 4 shows the still image data displayed on the TV set (part 2)

If the result at Step S7 is affirmative, the icon 7A blinks (Step S11). Whether or not a second predetermined time (such as 3 seconds) has elapsed after the first predetermined time is then judged (Step S12). If a result at Step s12 is negative, the process goes to Step S8 and the procedures from Step S8 are carried out. If the result at Step S12 is affirmative, the icon 7A having the cross is changed to an icon 7B having a circle (○), as shown by FIG. 4, to indicate that the current still image data set S0 has been selected (Step S13). An audio message notifying the fact that the still image data set S0 being displayed has been selected is output (Step S14). The process then goes to Step S10, and the procedures from Step S10 are carried out for display of the following still image data set S0 on the TV 3.

As has been described above, according to the first embodiment, when one of the still image data sets S0 is displayed on the TV 3 for selection from the still image data sets S0, the following still image data set S0 is displayed if the Right key 15D is pressed for not selecting the still image data set S0 being displayed. In the case where the still image data set being displayed is selected, the still image data set is selected by waiting for the second predetermined time, and the following still image data set S0 is then displayed. Therefore, the user who carries out selection from the still image data sets S0 can instruct selection or non-selection regarding the still image data sets S0 with only a few operations therefor. Consequently, a burden on the user can be reduced at the time of selection.

Furthermore, since the icon 7A blinks before the still image data set S0 is changed to a selection state, the user can easily understand that the still image data set S0 being displayed is going to be selected.

Moreover, since the audio message is output at the time of selection of the still image data set S0 being displayed, the user can easily understand the fact that the current still image data set S0 has been selected.

In the first embodiment described above, the icon 7A having the X is displayed together with the still image data set S0, for indicating that the still image data set S0 being displayed is in the state of non-selection. However, the still image data set S0 may be displayed together with the icon 7B having the circle for indicating that the still image data set S0 being displayed is in the selected state. In this case, the icon 7B having the circle is changed to the icon 7A having the X at Step S13, and the still image data set S0 is changed to be in the non-selected state.

Figure 5:
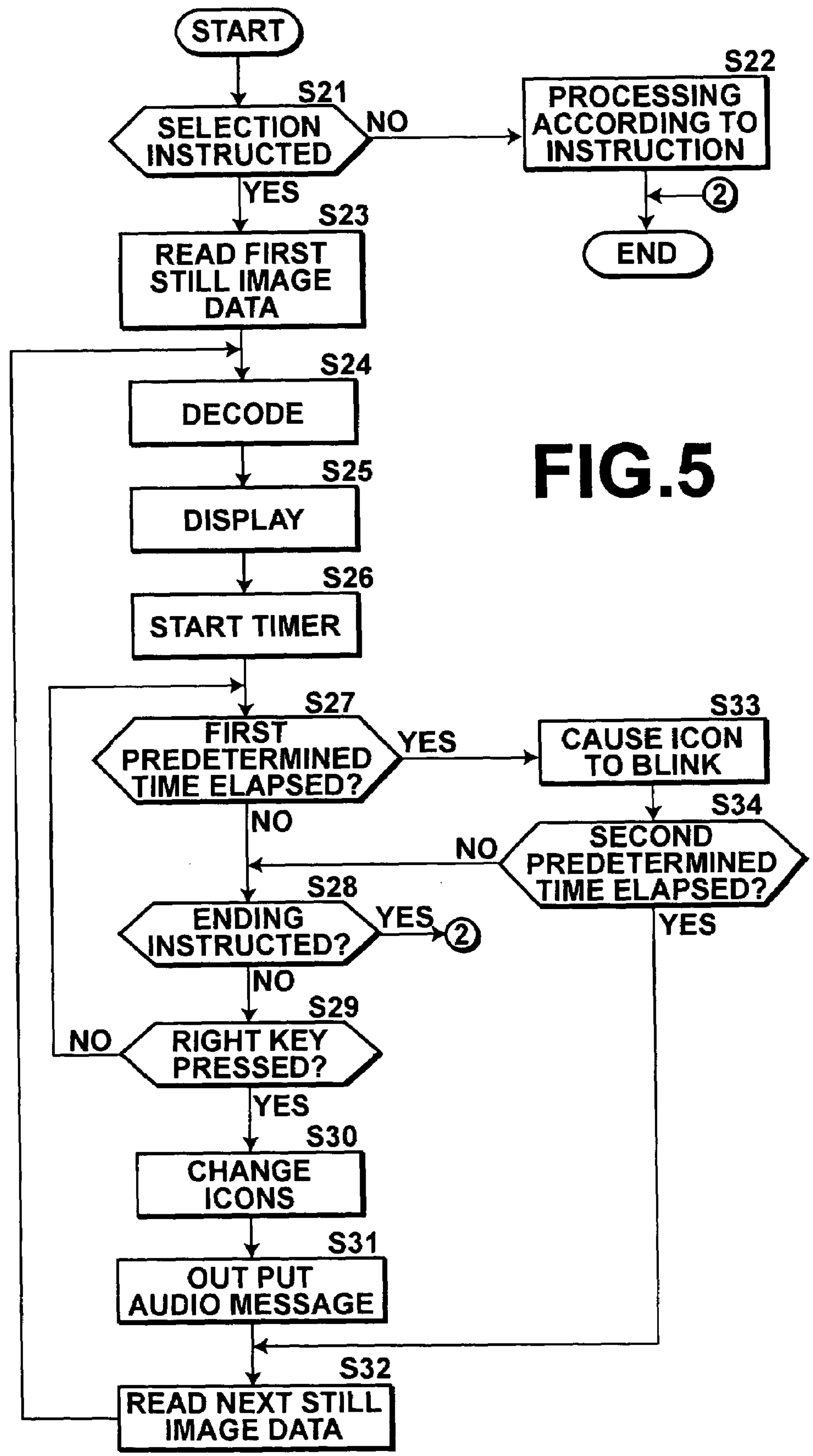
FIG. 5 is a flow chart showing procedures carried out at the time of still image data selection in a second embodiment of the present invention.

A second embodiment of the present invention will be explained next. In the second embodiment and a third embodiment that will be explained later, the same elements as in the first embodiment have the same reference numbers, and detailed explanations thereof will be omitted. FIG. 5 is a flow chart showing procedures carried out in the second embodiment. Whether or not the still image data selection instruction has been input in the instruction screen is judged first (Step S21). If a result at Step S21 is negative, processing corresponding to the instruction that was input in the instruction screen is carried out (Step S22) to end the operation. If the result at Step S21 is affirmative, the still image data set S0 having the file name that comes first is read from the recording medium M by the media drive 11 (Step S23), and decoded by the decoder 12 (Step S24). The still image data set S0 is then output from the TV terminal 17 and displayed on the TV 3 (Step S25).

When the still image data set S0 is displayed on the TV 3, the timer is activated (Step S26), and whether or not the first predetermined time (such as 2.5 seconds) has elapsed since display of the still image data set S0 is then judged (Step S27).

If a result at Step S17 is negative, whether or not the instruction for ending the operation has been input is judged (Step S28). If a result at Step S28 is affirmative, the operation ends. If the result at Step S28 is negative, whether or not the Right key 15D for displaying the following still image data set S0 has been pressed is judged (Step S29). If a result at Step S29 is negative, the process returns to Step S27. If the result at Step S29 is affirmative, the icon 7A having the X is changed to the icon 7B having the circle for indicating that the still image data set S0 being displayed has been selected (Step S30). The audio message for notifying that the still image data set S0 has been selected is output (Step S31), and the following still image data set S0 whose file name comes next to the file name of the current still image data set S0 is read from the recording medium M (Step S32). The process then returns to Step S24 and the procedures from Step S24 are carried out for display of the following still image data set S0 on the TV 3. In the case where the still image data set S0 whose file name comes last is being displayed, the following still image data set S0 refers to the still image data set S0 having the file name that comes first.

If the result at Step S27 is affirmative, the icon 7A blinks (Step S33), and whether or not the second predetermined time (such as 3 seconds) has elapsed after the first predetermined time is judged (Step S34). If a result at Step S34 is negative, the process returns to Step S28 and the procedures from Step S28 are carried out. If the result at Step S34 is affirmative, the process returns to Step S32 and the procedures from Step S32 are carried out for display of the following still image data set S0 on the TV 3.

As has been described above, in the second embodiment, when one of the still image data sets S0 is displayed on the TV 3 at the time of selection from the still image data sets S0, the still image data set S0 being displayed is selected if the Right key 15D is pressed during the display thereof, and the following still image data set S0 is then displayed. In the case where the current still image data set S0 is not selected, the following still image data set S0 is displayed after the second predetermined time has elapsed with no operation. Therefore, a user who carries out selection from the still image data sets S0 can instruct selection or non-selection of the still image data sets with only a few operations. Consequently, the user is less burdened at the time of selection.

In the first and second embodiments described above, the still image data set S0 having the file name that comes immediately before the file name of the current still image data set S0 can be displayed by pressing the Left key 15C. At this time, the still image data set S0 has already been attached with the icon 7A or 7B representing the selected or non-selected state thereof. In this state, by pressing the Up or Down key 15A or 15B, selection or non-selection of the still image data set S0 can be changed from one to the other.

Figure 6:
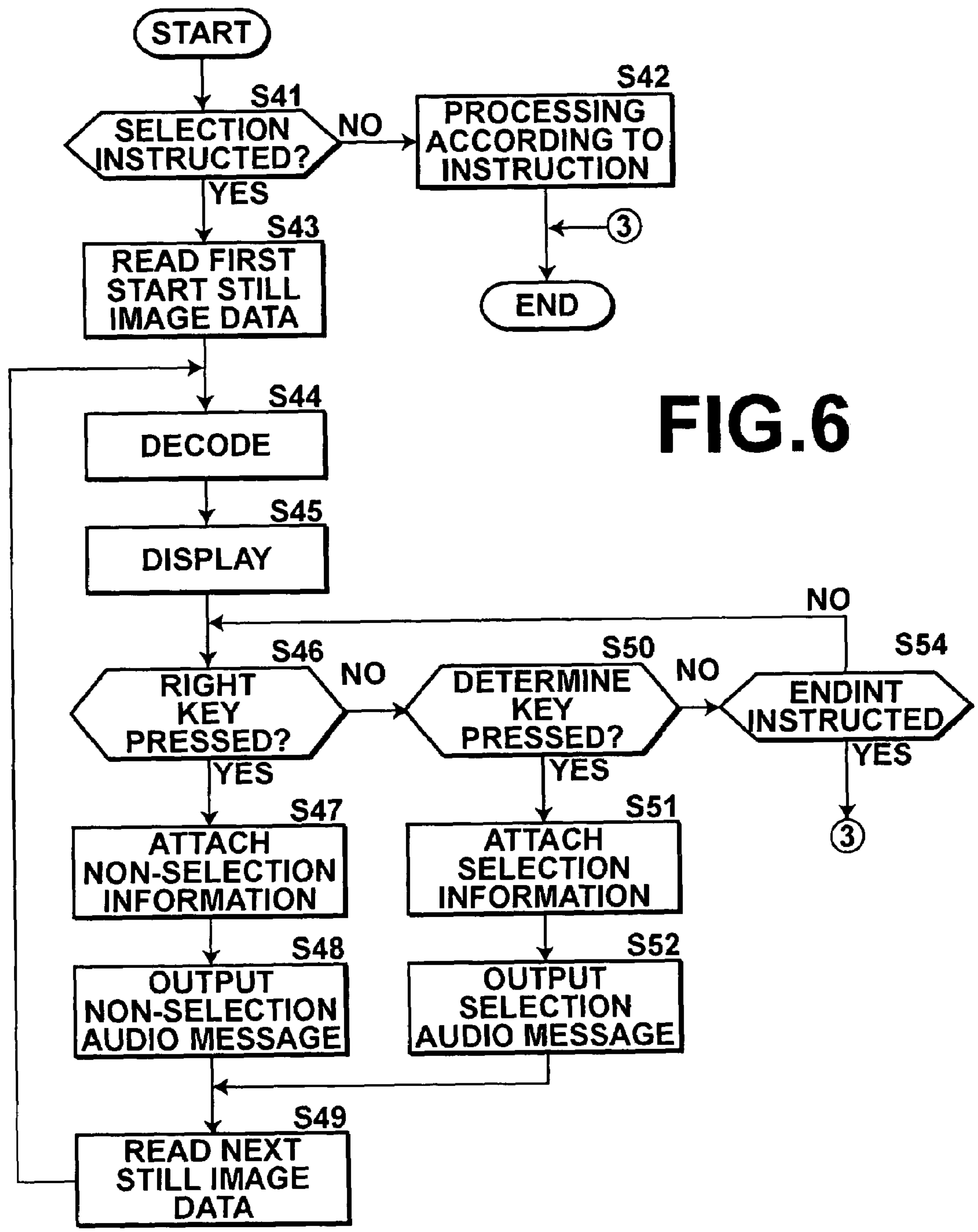
FIG. 6 is a flow chart showing procedures carried out at the time of still image data selection in a third embodiment of the present invention.

The third embodiment of the present invention will be explained next. FIG. 6 is a flow chart showing procedures carried out in the third embodiment. Whether or not the still image data selection instruction has been input in the instruction screen is judged first (Step S41). If a result at Step S41 is negative, the processing corresponding to the instruction that was input in the instruction screen is carried out (Step S42) to end the operation. If the result at Step S41 is affirmative, the still image data set S0 having the file name that comes first is read from the recording medium M by the media drive 11 (Step S43), and decoded by the decoder 12 (Step S44). The still image data set S0 is then output from the TV terminal 17 to be displayed on the TV 3 (Step S45).

Figure 7:
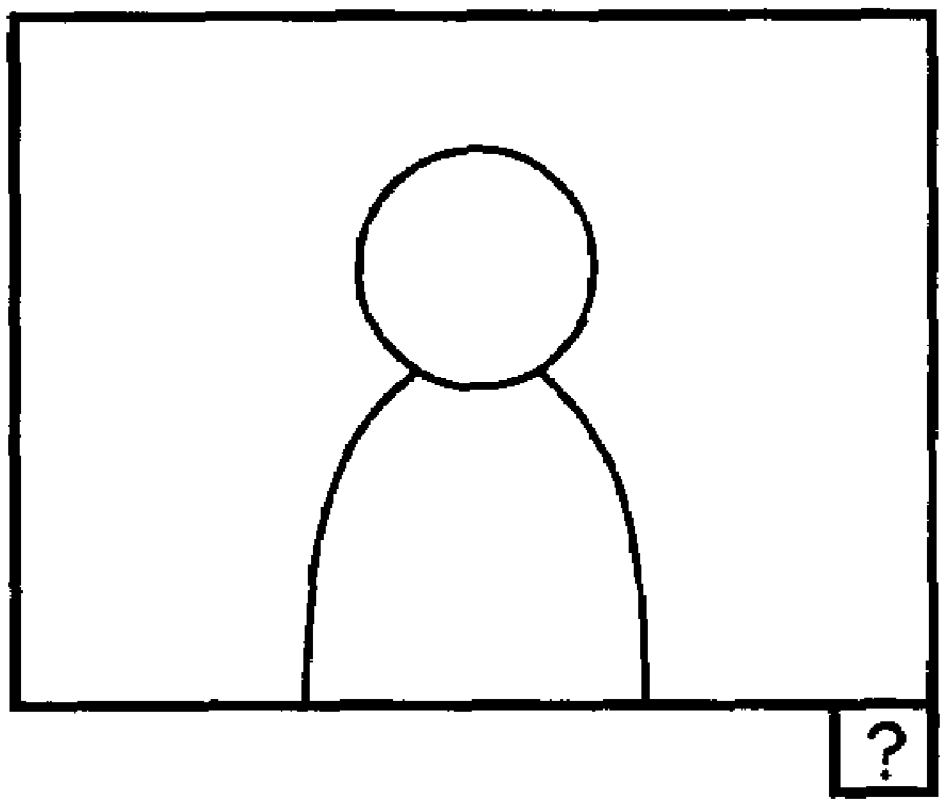
FIG. 7 shows the still image data displayed on the TV set (part 3).

FIG. 7 shows an image represented by the still image data set S0 displayed on the TV 3. As shown in FIG. 7, an icon 7C having a question mark (?) is displayed in the lower right corner of the still image. The icon 7C represents the fact that selection or non-selection of the current still image data set S0 has not been instructed. Whether or not the Right key 15D has been pressed is then judged (Step S46). If a result at Step S46 is affirmative, information representing non-selection of the current still image data set S0 is attached to the current still image data set S0 (Step S47), and an audio message indicating non-selection is also output (Step S48). The information representing non-selection is described in tag information of the still image data set S0.

The still image data set S0 having the file name that comes immediately after the file name of the current still image data set S0 is read from the recording medium M (Step S49), and the process returns to Step S44. The procedures from Step S44 are then carried out, and the following still image data set S0 is displayed on the TV 3. In the case where the current still image data set S0 has the file name that comes last, the still image data set S0 whose file name comes first is displayed as the still image data set S0 having the file name that comes immediately after the file name of the current still image data set S0.

If the result at Step S46 is negative, whether or not the Determine key 15E has been pressed is then judged (Step S50). If a result at Step S50 is affirmative, information is attached to the currently displayed still image data set S0 for representing selection thereof (Step S51). An audio message indicating the selection is also output (Step S52). The audio message output at Step S52 is different from the audio message output at Step S48. The process then returns to Step S49 for display of the following still image data set S0, and the procedures from Step S49 are carried out. The following still image data set S0 is therefore displayed.

If the result at Step S50 is negative, whether or not the instruction for ending the operation has been input is judged (Step S54). If a result at Step S54 is affirmative, the operation ends. If the result at Step S54 is negative, the process returns to Step S46, and the procedures from Step S46 are carried out.

As has been described above, according to the third embodiment, when one of the still image data sets S0 is displayed on the TV 3 at the time of selection from the still image data sets S0, the following still image data set S0 having the file name that comes next to the file name of the currently displayed still image data set S0 is displayed if the Right key 15D is pressed during the display thereof, for not selecting the current still image data set S0. In the case where the current still image data set SO is to be selected, the current still image data set S0 can be selected by pressing the Determine key 15E, and the following still image data set S0 is then displayed. Therefore, a user who carries out selection from the still image data sets S0 can instruct selection or non-selection of the still image data sets with only a few operations. Consequently, the user is less burdened at the time of selection.

Moreover, since the audio message is output at the time of selection of the still image data set S0 being displayed, the user can easily understand that the still image data set S0 being displayed is in the selection state.

In the third embodiment, the still image data set S0 having the file name that comes immediately before the file name of the current still image data set S0 can be displayed by pressing the Left key 15C. At this time, the icon 7A or 7B representing selection or non-selection, or icon 7C representing that selection or non-selection has not been instructed is shown together with the still image data set S0. By pressing the Up or Down key 15A or 15B in this state, selection or non-selection of the still image data set S0 can be changed from one to the other.

In the first to third embodiments described above, the still image data sets S0 that have been selected are sent from the communication interface 31 connected to the input/output terminal 18 to the Web site 33 of the DPE store via the Internet 32, and are used for various kinds of printing services therein.

What is claimed is:

1. An image selection method for instructing selection or non-selection regarding a plurality of images, the image selection method comprising the steps of:

displaying selection status information representing a selection or non-selection state of each of the images being attached thereto when the images are sequentially displayed in predetermined order;

displaying one of the images without changing the selection status information of an immediately preceding one of the images in the case where a display instruction thereof has been input within a predetermined time after display of the immediately preceding image, and displaying the image while changing the selection status information of the immediately preceding image in the case where the display instruction thereof has not been input within the predetermined time.

2. An image selection method as defined in claim 1, further comprising the step of changing how the selection status information is displayed before changing the selection status information.

3. An image selection method as defined in claim 1, further comprising the step of outputting a sound notifying the fact that the selection status information has been changed.

4. An image selection method for instructing selection or non-selection regarding a plurality of images, the image selection method comprising the steps of:

displaying selection status information representing a selection or non-selection state of each of the images being attached thereto when the images are sequentially displayed in predetermined order;

displaying one of the images while changing the selection status information of an immediately preceding one of the images in the case where a display instruction thereof has been input within a predetermined time after display of the immediately preceding image, and displaying the image without changing the selection status information of the immediately preceding image in the case where the display instruction thereof has not been input within the predetermined time.

5. An image selection method as defined in claim 4, further comprising the step of changing how the selection status information is displayed before changing the selection status information.

6. An image selection method as defined in claim 4, further comprising the step of outputting a sound notifying the fact that the selection status information has been changed.

7. An image selection apparatus for instructing selection or non-selection regarding a plurality of images, first image selection apparatus comprising:

input means for inputting a display instruction regarding an image; and selection means for displaying selection status information representing a selection or non-selection state of each of the images being attached thereto when the images are sequentially displayed in predetermined order, displaying one of the images without changing the selection status information of an immediately preceding one of the images in the case where the display instruction thereof has been input within a predetermined time after display of the immediately preceding image, and displaying the image while changing the selection status information of the immediately preceding image in the case where the display instruction thereof has not been input within the predetermined time.

8. An image selection apparatus as defined in claim 7, wherein the selection means is also means for changing how the selection status information is displayed before changing the selection status information.

9. An image selection apparatus as defined in claim 7, wherein the selection means is also means for outputting a sound notifying the fact that the selection status information has been changed.

10. An image selection apparatus for instructing selection or non-selection regarding a plurality of images, the image selection apparatus comprising:

input means for inputting a display instruction regarding an image; and selection means for displaying selection status information representing a selection or non-selection state of each of the images being attached thereto when the images are sequentially displayed in predetermined order;

for displaying one of the images while changing the selection status information of an immediately preceding one of the images in the case where the display instruction thereof has been input within a predetermined time after display of the immediately preceding image, and for displaying the image without changing the selection status information of the immediately preceding image in the case where the display instruction thereof has not been input within the predetermined time.

11. An image selection apparatus as defined in claim 10, wherein the selection means is also means for changing how the selection status information is displayed before changing the selection status information.

12. An image selection apparatus as defined in claim 10, wherein the selection means is also means for outputting a sound notifying the fact that the selection status information has been changed.

13. A program for causing a computer to execute an image selection method for instructing selection or non-selection regarding a plurality of images, the program comprising the steps of:

displaying selection status information representing a selection or non-selection state of each of the images being attached thereto when the images are sequentially displayed in predetermined order;

displaying one of the images without changing the selection status information of an immediately preceding one of the images in the case where a display instruction thereof has been input within a predetermined time after display of the immediately preceding image, and displaying the image while changing the selection status information of the immediately preceding image in the case where the display instruction thereof has not been input within the predetermined time.

14. A program as defined in claim 13, further comprising the step of changing how the selection status information is displayed before changing the selection status information.

15. A program as defined in claim 13, further comprising the step of outputting a sound notifying the fact that the selection status information has been changed.

16. A program for causing a computer to execute an image selection method for instructing selection or non-selection regarding a plurality of images, the program comprising the steps of:

displaying selection status information representing a selection or non-selection state of each of the images being attached thereto when the images are sequentially displayed in predetermined order;

displaying one of the images while changing the selection status information of an immediately preceding one of the images in the case where a display instruction thereof has been input within a predetermined time after display of the immediately preceding image, and displaying the image without changing the selection status information of the immediately preceding image in the case where the display instruction thereof has not been input within the predetermined time.

17. A program as defined in claim 16, further comprising the step of changing how the selection status information is displayed before changing the selection status information.

18. A program as defined in claim 16, further comprising the step of outputting a sound notifying the fact that the selection status information has been changed.

* * * * *